(12) United States Patent
Mercea et al.

(10) Patent No.: US 8,913,042 B2
(45) Date of Patent: Dec. 16, 2014

(54) FORCE SENSING STYLUS

(75) Inventors: Cornel Mercea, Waterloo (CA); Yu Gao, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 184 days.

(21) Appl. No.: 13/556,370

(22) Filed: Jul. 24, 2012

(65) Prior Publication Data
US 2014/0028633 A1 Jan. 30, 2014

(51) Int. Cl.
*G06F 3/033* (2013.01)

(52) U.S. Cl.
USPC ......................................... 345/179

(58) Field of Classification Search
None
See application file for complete search history.

(56) References Cited

U.S. PATENT DOCUMENTS

| | | | |
|---|---|---|---|
| 4,318,096 A | 3/1982 | Thornburg et al. | |
| 4,513,437 A | 4/1985 | Chainer et al. | |
| 4,536,746 A | 8/1985 | Gobeli | |
| 4,896,543 A | 1/1990 | Gullman | |
| 5,263,375 A | 11/1993 | Okada | |
| RE35,016 E | 8/1995 | Gullman et al. | |
| 5,981,883 A | 11/1999 | Shriver | |
| 6,324,920 B1 | 12/2001 | DeSchrijver | |
| 6,731,270 B2 | 5/2004 | Tosaya | |
| 7,218,040 B2 | 5/2007 | Toda | |
| 7,839,394 B2 | 11/2010 | Zloter et al. | |
| 8,063,322 B2 | 11/2011 | Katsurahira | |
| 2004/0100456 A1 | 5/2004 | Wang | |
| 2004/0113896 A1* | 6/2004 | Monroe | 345/179 |
| 2005/0156912 A1 | 7/2005 | Taylor et al. | |
| 2007/0279399 A1* | 12/2007 | Nishimura et al. | 345/179 |
| 2011/0102379 A1* | 5/2011 | Lapstun et al. | 345/179 |
| 2011/0298709 A1* | 12/2011 | Vaganov | 345/158 |
| 2012/0026091 A1 | 2/2012 | Harper et al. | |
| 2012/0113065 A1 | 5/2012 | Chin | |

OTHER PUBLICATIONS

European Search Report, EP12177708.0, Mar. 22, 2013.
Baki et all, "Miniature tri-axial force sensor for feedback in minimally invasive surgery", Biomedial Robotics and Biomechatronics (BIOROB), 2012 4$^{th}$ IEEE RAS & EMBS, Jun. 24, 2012, pp. 805-810.
Buetefisch et al., "Taktiler Dreikomponentien-Kraftsensor Silicon Three-Axial Tactile Force Sensor", Technisches Messen TM, R. Oldenbourg Verlag, vol. 66, No. 5, May 1, 1999, pp. 185-190 (English translation not available from EPO).
European Search Report, EP12177708.0, Dec. 21, 2012.

* cited by examiner

*Primary Examiner* — Adam R Giesy

(57) ABSTRACT

The present disclosure provides a force sensing stylus that includes a shaft. The shaft has a tip-end, which protrudes from the stylus body, and an interior-end that is located within the body. The shaft is supported in the body at the tip-end by a compliant element. A multi-axis force sensor, in contact with the interior-end of the shaft, senses lateral and longitudinal components of a force applied to the tip-end of the shaft, or a combination thereof. The sensed force components may be transmitted to an electronic device and used to control an application executed on the device.

21 Claims, 5 Drawing Sheets

FORCE SENSING STYLUS

BACKGROUND

Stylus pointing devices enable information to be input to a host electronic device. In addition, the longitudinal or axial component of the force, or pressure, applied to the tip of a stylus enables control of various aspects or features of a drawing application executed on a computer or other processing device. In turn, this facilitates improved simulation of some physical drawing implements. However, other physical drawing implements respond to additional characteristics, such as the angle of the drawing implement with respect to the drawing surface. A tilt or gravity sensor may be employed to measure the angle of the stylus relative to the vertical direction. However, this approach does not indicate the angle of the stylus relative to the drawing surface (except in the special case where the surface is horizontal). Handheld devices, such as tablet computers and mobile telephones, are often used in a non-horizontal orientation. It would therefore be useful to provide an expedient for determining the angle of a stylus relative to a drawing surface.

BRIEF DESCRIPTION OF THE DRAWINGS

Exemplary embodiments of the present disclosure will be described below with reference to the included drawings such that like reference numerals refer to like elements and in which.

DETAILED DESCRIPTION

Figure 1:
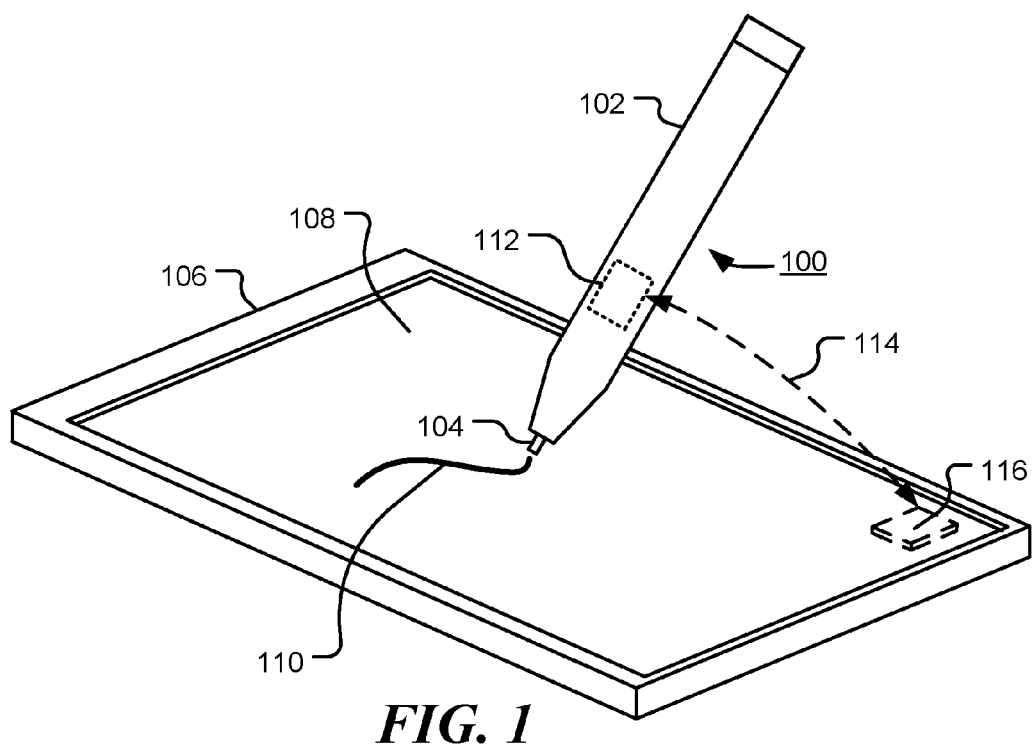
FIG. 1 is a diagrammatic representation of a force sensing stylus, in accordance with exemplary embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

One aspect of the present disclosure relates to a force sensing stylus that senses both longitudinal and lateral forces, or a combination thereof, applied to a tip of the stylus. In one embodiment, the stylus comprises a body and a shaft disposed within the body. The shaft has a tip-end that protrudes from the body and an interior-end located within the body. A compliant element is configured to support the tip-end of the shaft. A multi-axis force sensor in contact with the interior-end of the shaft is operable to sense lateral and longitudinal forces applied to the tip-end of the shaft. The multi-axis force sensor may include at least three sensing elements in contact with the interior-end of the shaft. The stylus may also include a transverse support through which the shaft passes and on which the shaft is cantilevered and/or pivoted.

In operation, a force applied to a tip-end of a stylus may be sensed by sensing force components applied to force sensors in contact with an interior-end of a shaft. The sensed force components are combined to produce a description of a force applied to the tip end of the stylus. The description of the force applied to the tip end of the stylus is output and may be used to control an application executed on a host processor.

A further aspect of the present disclosure relates to control of an application executing on an electronic device. Components of a force applied to a tip of a stylus are determined in response to a plurality of force components sensed by the stylus. The components are provided as input to the application and used to adjust an aspect of the application.

In operation, the direction of a force applied to the tip of the stylus is dependent, at least in part, on the orientation of the stylus with respect to a drawing surface, while the magnitude of the force relates to the pressure applied by the user. When using a physical drawing or writing implement, such as an ink pen or a paint brush, the properties of a line drawn by the implement depends on both the magnitude and direction of the applied force. The behaviour of a physical drawing or writing implement may be simulated more accurately when such information is made available to an application, such as computer drawing or writing application, executing on an electronic device. It will be apparent to those of ordinary skill in the art that the force information provided by the stylus enables user interaction with, and control, an electronic device in a variety of ways. For example, the magnitude of longitudinal or lateral forces may be used to input numerical values, or the direction of the force may be used to control the orientation of an object rendered on a screen. Still further, 'rolling' pen about its longitudinal axis changes the direction of the lateral force relative the stylus, which provides a further control input. In general, the force vector provides three independent parameters that may be used in a variety of ways.

FIG. 1 is a diagrammatic representation of a force sensing stylus 100, in accordance with exemplary embodiments of the present disclosure. The stylus 100 has a body 102. A tip 104 protrudes from the body 102. The stylus 100 may be used to provide input to a host electronic device 106 by moving the stylus across display and drawing surface 108 of the electronic device. The host electronic device 106 may be, for example, a laptop computer, tablet computer (tablet), mobile phone, personal digital assistant (PDA), display screen, or other portable or non-portable electronic device. The stylus 100 may provide input to control a drawing application executed on a processor of the host electronic device. The input includes position input, for example, that is processed to render a line 110 on the display 108. In accordance with one aspect of the present disclosure, the stylus 100 also provides input relating to the force applied to the tip 104 of the stylus 100. The force input may be communicated from an electronic circuit 112 of the stylus 100 over a communication link 114 to a receiving circuit 116 of the host electronic device 106.

Figure 2:
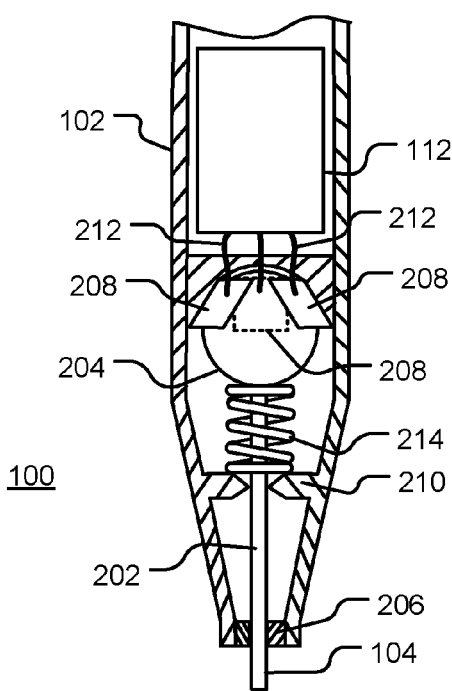
FIG. 2 is a sectional view of a force sensing stylus, in accordance with exemplary embodiments of the present disclosure.

FIG. 2 is a sectional view of the writing end of a force sensing stylus 100, in accordance with exemplary embodiments of the present disclosure. The stylus 100 includes a shaft 202 having a tip-end 104 that protrudes from the body 102 of the stylus and an interior-end 204 located within the body. A compliant element 206 is located in proximity to the tip-end 104 of the shaft 202 and is configured to support the tip-end 104 of the shaft 202. A multi-axis force sensor has sensing elements 208 that are in contact with the interior-end 204 of the shaft. The multi-axis force sensor is operable to sense lateral and longitudinal forces applied to the tip-end 104 of the shaft. The sensing elements 208 are mounted in the body 102 of the stylus. The compliant element 206, which may be constructed of a rubber-like material, is selected to be more compliant than sensing elements 208 so that forces applied to tip-end 104 of the shaft are balanced by forces applied to sensing elements at the interior-end 204, rather than by the compliant element 206. In some embodiments, the sensing elements 208 of the multi-axis force sensor are piezo-resistive sensing elements. However, other types of force sensors may be employed.

The body also includes a transverse support 210 through which the shaft 202 passes and on which the shaft is cantilevered and/or pivoted. A longitudinal force applied to the tip-end 104 pushes the interior-end 204 against the sensing elements 208. If the sensing elements 208 have high mechanical impedance, the shaft may be cantilevered on the transverse support 210. If the sensing elements 208 have low mechanical impedance, the shaft may be pivoted on the transverse support 210. For sensing elements with intermediate mechanical impedance, the shaft may be both pivoted and cantilevered. In all cases, a lateral force applied in one direction to the tip-end 104 causes the interior-end 204 to push in the opposite direction against the sensing elements 208. Thus, both lateral and longitudinal forces can be sensed. In general, each sensing element responds to a combination of lateral and longitudinal forces. However, since the orientations of the sensing elements are known, the signals output from sensing element may be combined, if desired, to provide a description of the longitudinal and lateral forces or to provide the magnitude and direction of the applied force. The relative compliance of the compliant element 206, the stiffness of the shaft 202 and the position of the transverse element 210 along the shaft 202 may be selected to enhance the response of the multi-axis force sensor.

In the embodiment shown, the interior-end 204 of the shaft 202 is at least partially spherical. In one illustrative embodiment, at least the parts of the surface of the interior end 204 that contact the sensing elements are convex, so as to provide a small contact area with the sensing elements. The sensing elements 208 are substantially planar and are arranged in contact with the interior-end 204. In the embodiment shown, the multi-axis force sensor has three sensing elements 208 that are configured to sense a combination of lateral and longitudinal forces.

In a further illustrative embodiment, the surface of the sensing elements 208 in contact with the interior end 204 of the shaft are convex, so as to provide a small contact area with the interior end 204 of the shaft.

More generally, three or more sensing elements are used to enable measurement of longitudinal and lateral forces applied to the tip-end of the shaft. The sensing elements are electrically coupled to the electronic circuit 112 via electrical conductors 212.

The stylus 100 may also include a bias element 214, such as a spring, that is adapted to bias the interior-end 204 of the shaft against the sensing elements 208 of the multi-axis force sensor. This ensures that contact is maintained even when no forces are applied to the tip-end 104 of the shaft 202. In addition, the use of bias element 214 allows both positive and negative forces to be measure—provided the bias is greater than the magnitude of the negative force. The signals produced from the sensors when no force is applied to the tip of the stylus may be used to calibrate the bias level. This allows variations in the bias force over time, due to changing temperature or humidity for example, to be accommodated automatically. When force is applied to the tip of the stylus, the calibrated bias level for each sensing element is subtracted from the signal, so that a signal smaller than the bias level corresponds to a negative force.

The electronic circuit 112 may include a signal combiner for combining the signals from the sensing elements to provide a description of the sensed lateral and longitudinal forces, and a wired or wireless transmitter to enable transmission of the description to an electronic device. An exemplary embodiment of the electronic circuit 112 is described below in reference to FIG. 8.

Figure 3:
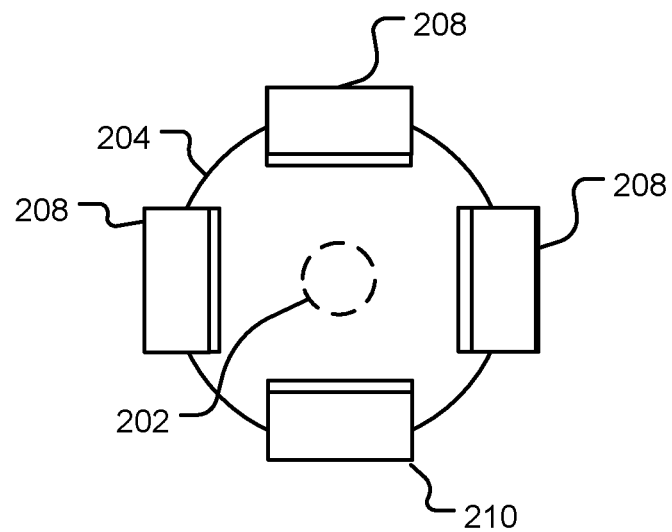
FIG. 3 is an end view of a shaft and force sensing elements of a force sensing stylus, in accordance with exemplary embodiments of the present disclosure.

Various configurations of sensing elements in the multi-axis force sensor will be apparent to those of ordinary skill in the art. FIG. 3 is a diagram of an exemplary embodiment using four sensing elements 208, viewed along a longitudinal axis of the shaft 202. The sensing elements 208 are equally spaced around the longitudinal axis of the shaft and each sensing element is tilted with respect to the axis. This enables a sensing element to contact the interior-end 204 of the shaft 202 and to measure both lateral and longitudinal forces. In a further embodiment, a sensing element may be located perpendicular to the longitudinal axis, so as to be sensitive to longitudinal forces only. Sensing elements may be placed parallel to the longitudinal axis, in which case additional mechanical biasing can be used to push the elements against the interior-end of the shaft.

Figure 4:
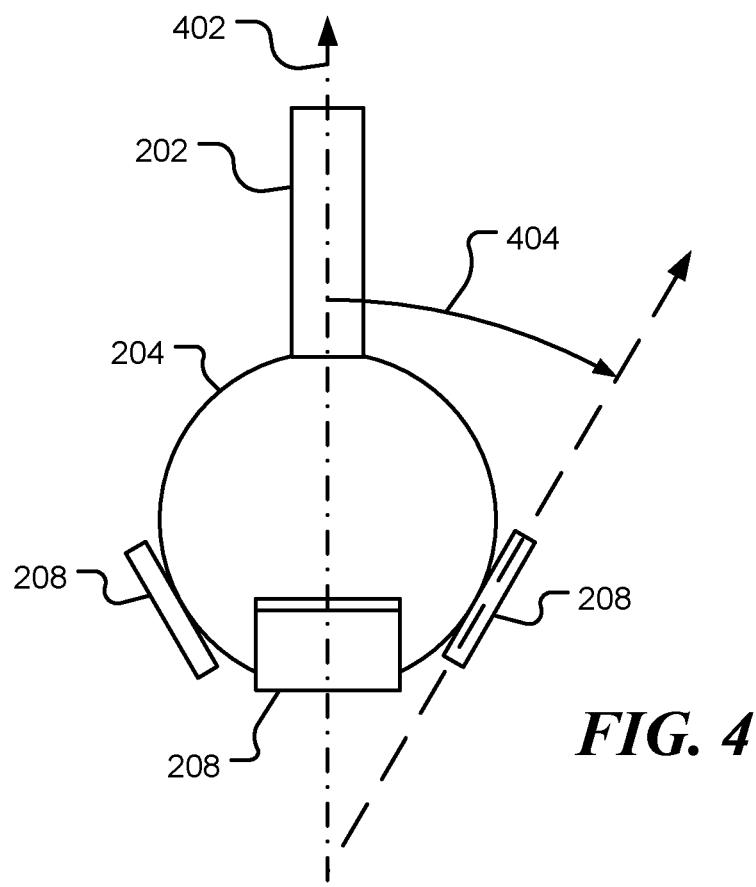
FIG. 4 is an side view of a shaft and force sensing elements of a force sensing stylus, in accordance with exemplary embodiments of the present disclosure.

FIG. 4 is a lateral view of the sensor element configuration shown in FIG. 3. FIG. 4 shows how a sensing element 208 is tilted with respect to the longitudinal axis 402 of the shaft 202. The sensing element s oriented at angle 404 to the longitudinal axis 402.

Figure 5:
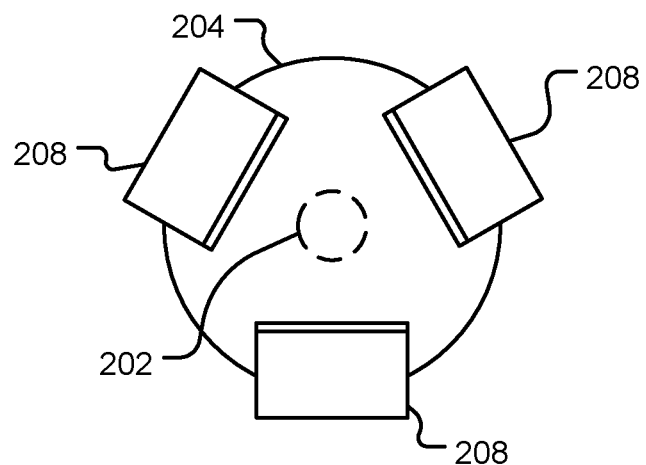
FIGS. 5 and 6 are diagrammatic views of a shaft and force sensing elements of a force sensing stylus, in accordance with exemplary embodiments of the present disclosure.

FIG. 5 is a diagrammatic view of an interior-end and force sensing elements of a force sensing stylus, in accordance with further exemplary embodiments. The figure shows three sensing elements 208, viewed along a longitudinal axis of the shaft 202. The sensing elements 208 are equally spaced around the longitudinal axis of the shaft 202, and each sensing element 208 is tilted with respect to the longitudinal axis of the shaft 202. The sensing elements 208 may be orientated substantially orthogonal to each other. In one embodiment, the spherical interior-end has radius $\sqrt{3}$ r, is centered at a location with Cartesian coordinates (0,0,0), and is oriented in the direction (1,1,1), while the sensors are located to contact the spherical interior-end at locations (−r,−r,0), (−r,0,−r), (0,−r,−r) and are orientated in directions (0,0,−1), (0,−1,0), (−1, 0,0), respectively.

Figure 6:
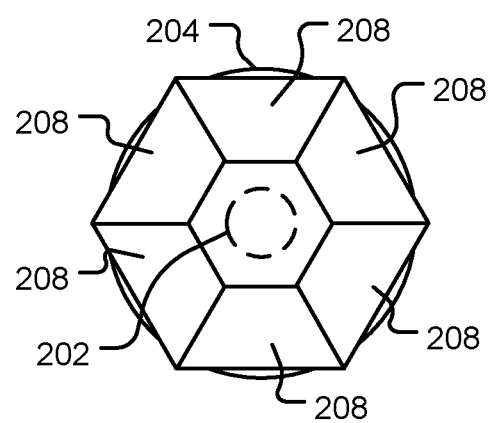

FIG. 6 is a diagrammatic view of an interior-end 204 and force sensing elements 208 of a force sensing stylus, in accordance with exemplary embodiments of the present disclosure. The figure shows six sensing elements 208, viewed along a longitudinal axis of the shaft 202. Again, the sensing elements 208 are equally spaced around the longitudinal axis of the shaft 202, and each sensing element 208 is tilted with respect to the longitudinal axis of the shaft. Other arrangements of sensing elements in the multi-axis force sensor will be apparent to those of ordinary skill in the art.

Figure 7:
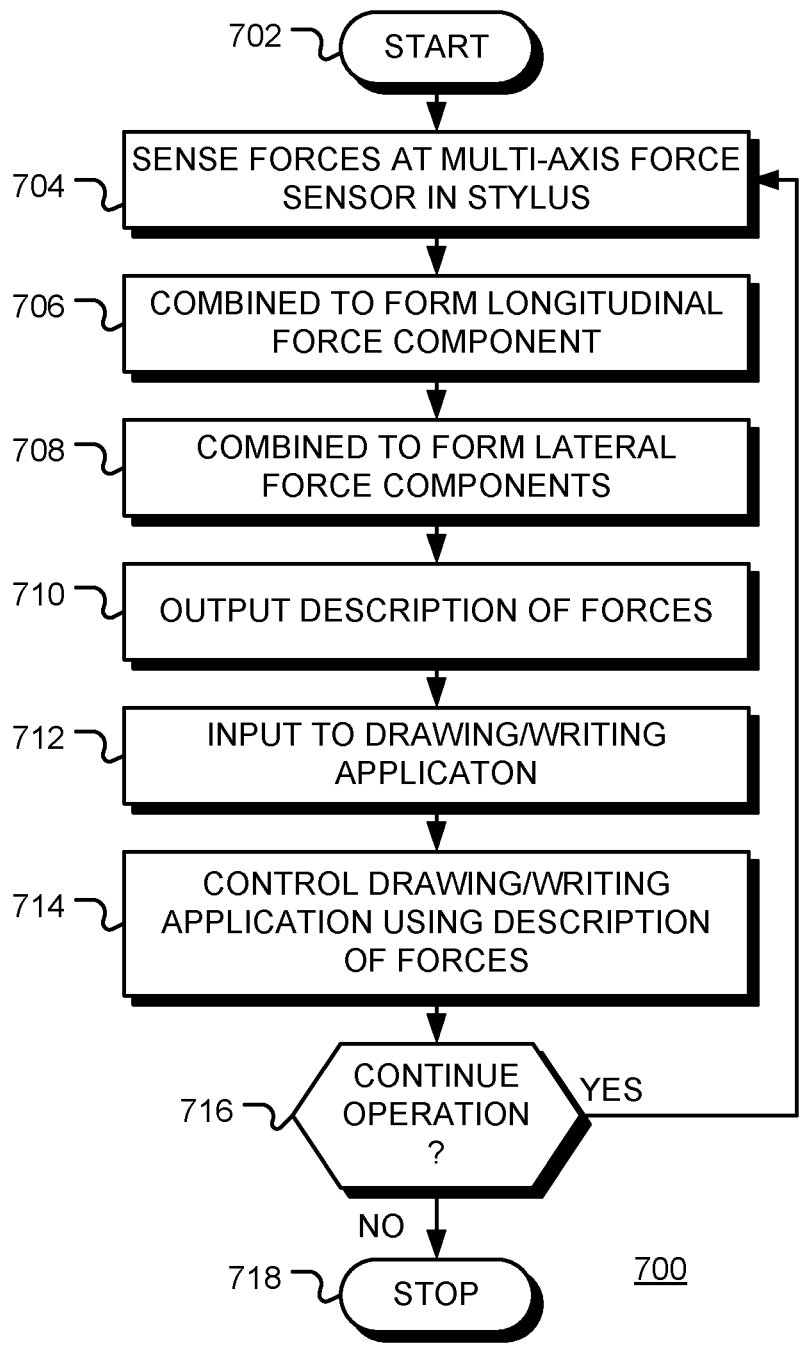
FIG. 7 is a flow chart of a method for controlling an application executed on an electronic device, in accordance with an exemplary embodiment of the present disclosure.

FIG. 7 is a flow chart 700 of a method for controlling a software application executed on a host electronic device. Following start block 702, a plurality of force components applied to a multi-axis force sensor in a force sensing stylus are sensed at block 704. The multi-axis force sensor may comprise a plurality of sensing elements in contact with an interior-end of a shaft that protrudes from the stylus to form the tip-end of the stylus. At block 706, the sensed force components are combined to form a longitudinal force component and, at block 708, the sensed force components are combined to form one or more lateral force components. For example, if the sensing elements are uniformly spaced around the interior-end of the shaft, the longitudinal component may be found by summing the signals from the sensing elements. In a further embodiment, the magnitude and direction of the force components, or some other representation of the force components, is determined. At block 710, a signal descriptive of the force components is output. For example, the signal may be transmitted from the stylus to a remote electronic device over a wireless communication link. At block 712, the signal descriptive of the force components is input to a drawing/writing application, or other application, executed on a host electronic device. At block 714, one or more aspects or features of the drawing/writing application, or other application, are controlled using the description of the force components. For example, one or more characteristics of a line rendered on a display screen may be adjusted dependent upon the magnitude and/or direction of the force or dependent upon components of the force. Characteristics include, for example, line thickness, type, color, opacity, saturation, etc. If continued operation is desired, as depicted by the positive branch from decision block 716, flow returns to block 704. Otherwise, as depicted by the negative branch from decision block 716, the method terminates at block 718.

Figure 8:
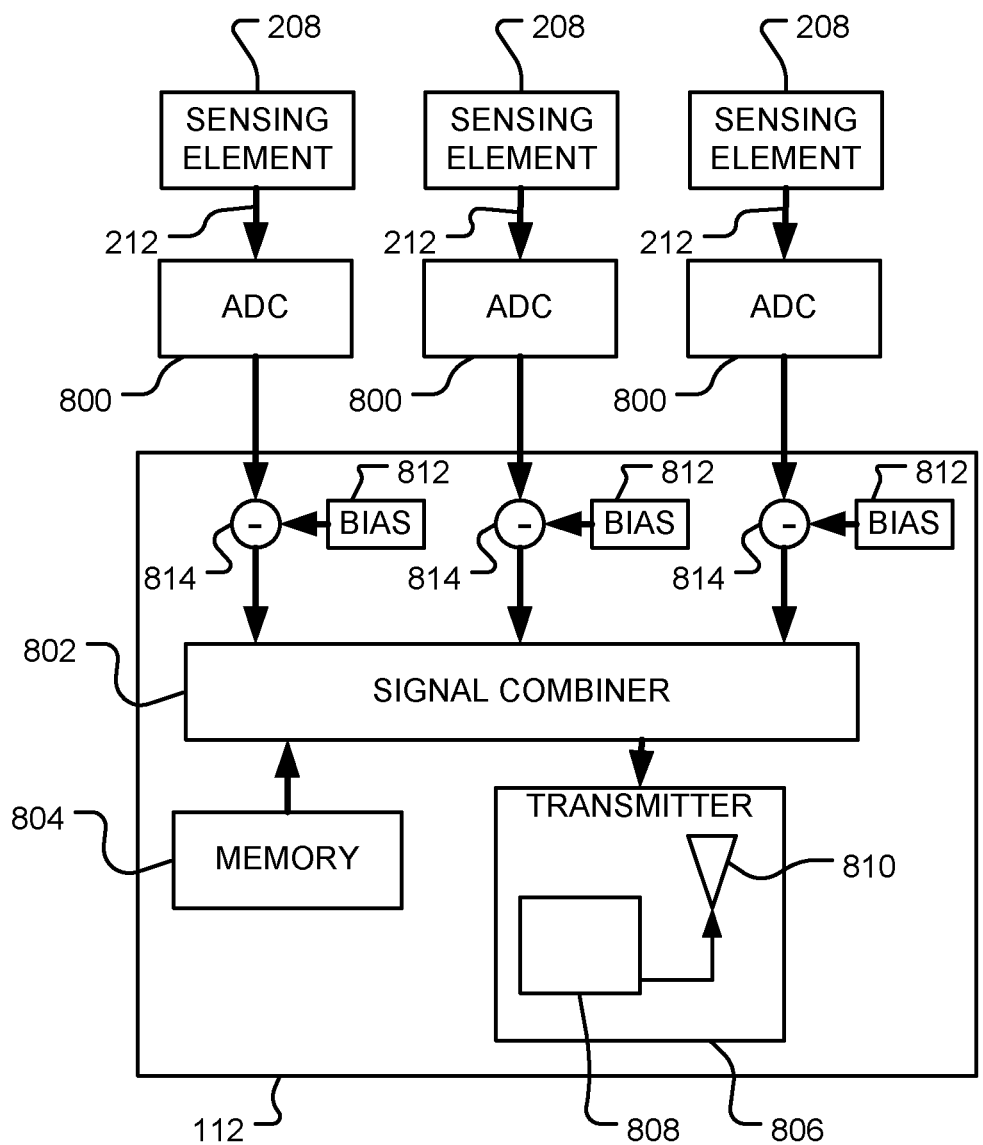
FIG. 8 is a block diagram of an electronic circuit of a force sensing stylus, in accordance with an exemplary embodiment of the present disclosure.

FIG. 8 is a block diagram of an electronic circuit 112 of a stylus in accordance with an exemplary embodiment. The electronic circuit 112 receives sensor signals on connections 212 from the sensing elements 208 of the multi-axis force sensor. Three elements are shown in the figure. However, in general, three or more sensing elements may be used. The sensor signals may be sampled in analog-to-digital converters 800 to provide sampled sensor signals that are passed to a signal combiner 802. The signal combiner 802 is operable to combine one or more of the sensor signals to provide a representation or description of the sensed forces. The description may include lateral and longitudinal force components, the magnitude and direction of the force, or some other representation, and may have an analog or digital format. The sensor signals may be combined dependent upon orientations of the sensing elements. The combination may be weighted sum of signals, the weights being stored in a memory 804. The circuit 112 also includes a transmitter 806 operable to transmit the representation of the sensed lateral and longitudinal forces to an electronic device. The transmitter, in turn, may include an encoder/modulator 808 and an antenna 810. In an alternative embodiment, the description of the sensed lateral and longitudinal forces may be communicated via a wired connection. The stylus 100 may incorporate one or more batteries to power the electronic circuit 112 and/or the multi-axis force sensor. The batteries may be replaceable or rechargeable.

When a bias force is used to hold the interior-end of the shaft against the sensing elements, a bias signal 812 may be subtracted from the sensed force component in subtractor 814. This enables measurement of both negative and positive forces.

If the normal direction to the surface of sensing element k is denoted by the vector $n_k$, the response, $s_k$, to a force vector $f \triangleq \{f_x, f_y, f_z\}^T$ applied to sensing element is given by $s_k = n_k^T f$, where the superposed T denotes the transpose. A vector of sensor outputs can be expressed as the matrix equation $$s = Af, \quad (1)$$

where $$s \triangleq \begin{bmatrix} s_1 \\ s_2 \\ \vdots \\ s_N \end{bmatrix} \text{ and } A \triangleq \begin{bmatrix} n_1^T \\ n_n^T \\ \vdots \\ n_N^T \end{bmatrix}. \quad (2)$$

The force vector is obtained from the sensed signals as the combination $$f = Ws, \quad (3)$$

where W is a weighting matrix. In one embodiment, the weighting matrix is given by $W = (A^T A)^{-1} A^T$.

When no external force is applied to the tip of the stylus, the sensor outputs are $$s_0 = A f_{bias}, \quad (4)$$

where $f_{bias}$ is the force due to the bias element. The external force applied to the tip of the stylus is therefore given by $$f_{tip} = W(s - s_0). \quad (5)$$

Equation (5) describes the force components are obtained as a weighted sum of the sensor signals. This computation is performed in the signal combiner 802, which may be a programmed processor, a field programmable gate array, a custom circuit or some other device. The elements of the matrix W are weightings to be applied when combining sensor signals. Since the orientations of the sensing elements are fixed, the matrix $W = (A^T A)^{-1} A^T$ may be pre-calculated and stored in the memory 804 of the stylus and/or the memory of an electronic device that responds to the stylus. The matrix inversion may only be performed when at least three sensing elements are used. In one embodiment, three substantially orthogonal sensing elements are used. If the z-direction is taken to be along the longitudinal axis of the stylus, the lateral components of the forces are $f_x$ and $f_y$, while the longitudinal component of the force is $f_z$. The magnitude of the lateral component is given by $\sqrt{f_x^2 + f_y^2}$, where the force is given by expression (3).

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A stylus comprising:
   a body;
   a shaft disposed within the body and having a tip-end that protrudes from the body and an interior-end located within the body;
   a transverse support through which the shaft passes and on the shaft is cantilevered and/or pivoted, the transverse support located between the tip-end and the interior end of the shaft;
   a compliant element configured to support the tip-end of the shaft;
   a multi-axis force sensor in contact with the interior-end of the shaft and operable to sense lateral and longitudinal forces applied to the tip-end of the shaft, the multi-axis force sensor comprising at least three sensing elements each in contact with a convex surface of the interior-end of the shaft;
   a signal combiner circuit operable to combine signals output from the at least three sensing elements to produce a representation of the lateral and longitudinal forces applied to the tip end of the stylus; and
   a transmitter operable to transmit the representation of the lateral and longitudinal forces over a communication link to a host electronic device.

2. A stylus in accordance with claim 1, where the multi-axis force sensor comprises three substantially orthogonal sensing elements.

3. A stylus in accordance with claim 1, where the interior-end of the shaft is at least partially spherical and where the multi-axis force sensor comprises a plurality of substantially planar sensing elements in contact with the interior-end of the shaft.

4. A stylus in accordance with claim 1, further comprising:
   a bias element adapted to bias the interior-end of the shaft against sensing elements of the multi-axis force sensor.

5. A stylus in accordance with claim 4, where the bias element comprises a spring.

6. A stylus in accordance with claim 1, where the multi-axis force sensor comprises a piezo-resistive sensing element.

7. A stylus in accordance with claim 1, where the signal combiner is operable to combine the signals from the at least three sensing elements dependent upon orientations of the sensing elements of the multi-axis force sensor.

8. A method of operating a stylus, the stylus comprising a body, a shaft disposed within the body and having a tip-end that protrudes the body and an interior-end located within the body; and a compliant:
   one more of cantilevering and pivoting the shaft on a transverse support through which the shaft passes, wherein the transverse support is located between the tip-end and the interior end of the shaft;
   sensing lateral and longitudinal forces applied to the tip-end of the shaft using a multi-axis force sensor in contact with the interior-end of the shaft, the multi-axis force sensor comprising at least three sensing elements each in contact with a convex surface of the interior-end of the shaft;
   combining signals from the sensing elements of the multi-axis force sensor to provide a representation of the sensed lateral and longitudinal forces applied to the tip end of the stylus; and
   outputting the representation of the sensed lateral and longitudinal forces applied to the end of the stylus,
where outputting the representation of the lateral and longitudinal forces applied to the tip end of the stylus comprises transmitting the representation over a communication link to a host electronic device.

9. The method of claim 8, where the interior-end of the shaft is held in contact with the plurality of force sensors by a bias force, the method further comprising
   sensing bias force components from the plurality of force sensors when no force is applied to the tip-end of the stylus; and
   subtracting the sensed bias force components from the plurality of sensed force components when a force is applied to the tip-end of the stylus.

10. The method of claim 8, where sensing the plurality of force components comprises sensing force components from three substantially orthogonal sensing elements.

11. The method of claim 8, where combining where combining the signals comprises determining a weighted sum of the lateral and longitudinal forces.

12. The method of claim 11, further comprising retrieving weights used in the weighted sum from a memory.

13. The method of claim 8, where the representation of the sensed lateral and longitudinal forces applied to the tip end of the stylus comprises a magnitude and a direction of the forces.

14. The method of claim 8, further comprising:
   sampling the sensed lateral and longitudinal forces,
   where the representation of the lateral and longitudinal forces applied to the tip end of the stylus comprises a digital description.

15. The method of claim 8, where the communication link comprises a wireless communication link.

16. The method of claim 8, where the communication link comprises a wired communication link.

17. A method of claim 8, further comprising:
   providing the output of the representation of the sensed lateral and longitudinal forces applied to a tip of stylus as an input to the application; and
   adjusting an aspect of the application executing on an electronic device of components of the force applied to a tip of the stylus. dependent upon the input.

18. The method of claim 17, where combining signals from the sensing elements comprises:

combining the sensed lateral and longitudinal forces dependent upon orientations of the at least three sensing elements of the stylus.

19. The method of claim 17, where the combining signals from the sensing elements of the forces comprises longitudinal and lateral components.

20. The method of claim 17, where combining signals from the sensing elements of the forces comprises magnitude and direction components.

21. The method of claim 17, where combining signals from the sensing elements of the forces comprises combining the sensed lateral and longitudinal forces dependent upon orientations of the at least three sensing elements of the stylus.

* * * * *

UNITED STATES PATENT AND TRADEMARK OFFICE
CERTIFICATE OF CORRECTION

PATENT NO. : 8,913,042 B2  
APPLICATION NO. : 13/556370  
DATED : December 16, 2014  
INVENTOR(S) : Cornel Mercea e al.

Page 1 of 1

It is certified that error appears in the above-identified patent and that said Letters Patent is hereby corrected as shown below:

In The Claims

Column 8, Line 8 should read as follows:
body; and a compliant element configured to support the tip-end of the shaft, the method comprising:

Column 8, Line 31 should read as follows:
shaft is held in contact with the sensing elements by a Column 8, Line 33 should read as follows:
sensing bias force components from the sensing elements Column 8, Line 39 should read as follows:
10. The method of claim 8, where sensing the signals Column 8, Line 42 should read as follows:
11. The method of claim 8, where combining Column 8, Line 63 should read as follows:
adjusting an aspect of an application executing on an Column 8, Line 64 should read as follows:
electronic device Column 8, Line 65 should be amended as follows:
dependent upon input.

Signed and Sealed this  
Twenty-second Day of September, 2015

Michelle K. Lee  
*Director of the United States Patent and Trademark Office*